Figure 1:
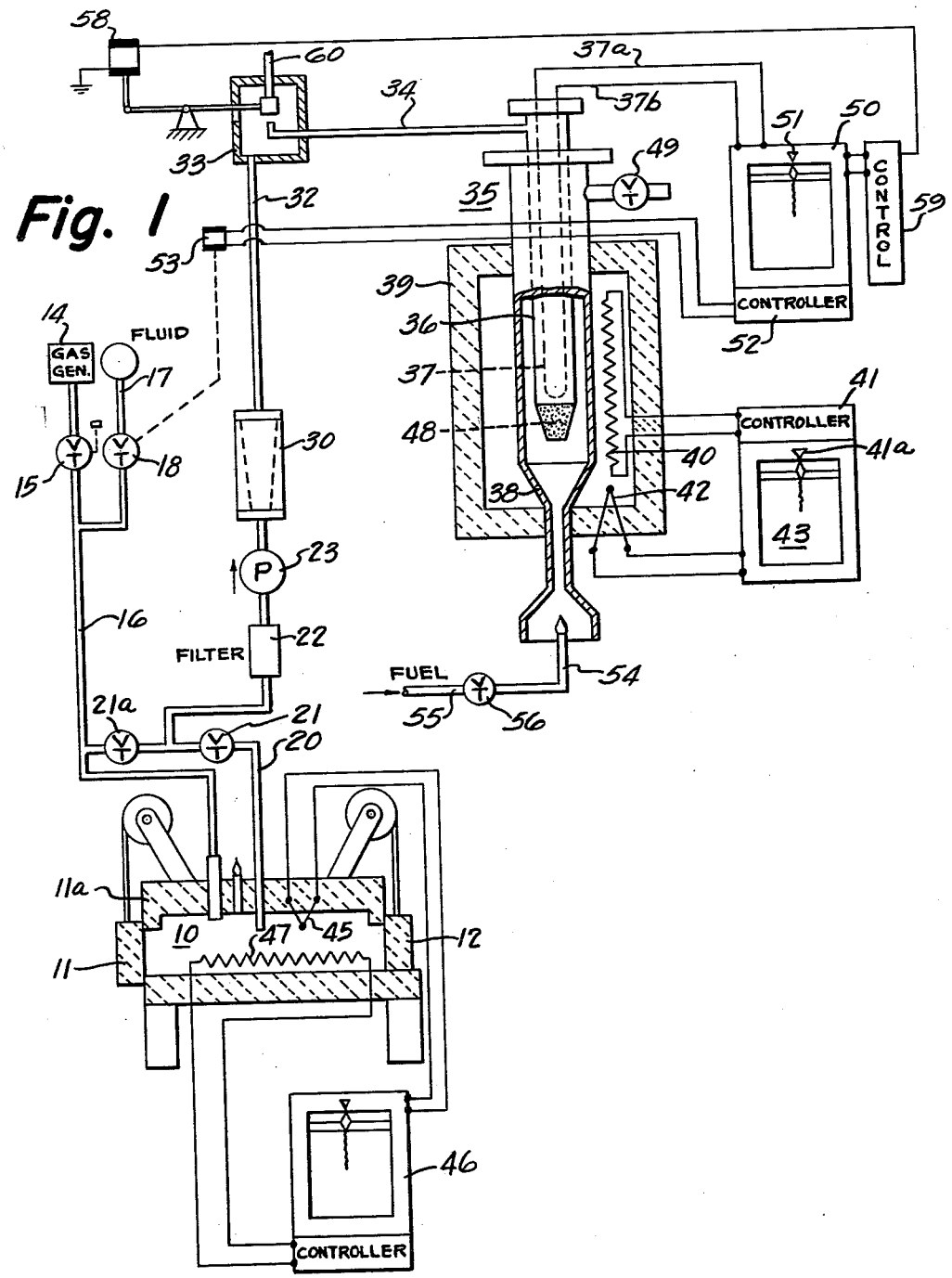

United States Patent Office 3,058,815
Patented Oct. 16, 1962

3,058,815
MEASUREMENT AND CONTROL OF CONSTITU-
ENT POTENTIALS
Raymond L. Davis II, Newtown Square, Pa., assignor to
Leeds and Northrup Company, Philadelphia, Pa., a corporation of Pennsylvania
Filed July 11, 1960, Ser. No. 42,013
5 Claims. (Cl. 23—255)

This invention relates to apparatus for measuring and controlling the constituent potentials of gaseous atmospheres and has for an object the provision of apparatus for periodically reducing the carbon content of a carbon-sensitive detecting element by an amount which is indicative of the absence of free carbon on and about the element thereby to assure carbon potential measurements unaffected by the presence of soot.

Where in the operation of carburizing furnaces carbon potentials in a treating zone are maintained well above values needed for the production of a given carbon content within the surface of the work, there arise problems due to the presence of free carbon in the form of soot. In my copending application, Serial No. 41,966, filed July 11, 1960, I have disclosed a system which accomplishes the measurement of carbon potentials far in excess of those to which the sensitive element will reliably respond. For some applications the provisions of my aforesaid system may not be needed even though the carbon potentials are to be of a relatively high order as long as they remain within the range at which the sensitive element can respond accurately to carbon potential. Where the carbon potentials are relatively high, free carbon in the form of soot can be expected to form in the region of the sensitive detecting element whether that element be located within the treating zone or in a separately heated compartment. Formation of soot is a function of carbon potential and time. Accordingly, for carbon potentials below those which rapidly form soot there may still arise a gradual accumulation of soot which may interfere with the measurement.

It is an object of the present invention periodically to remove any soot or free carbon which may form on and about the detecting element, this removal being accomplished during periods of time which are relatively short compared with the times during which the sensitive element is effective for the measurement of carbon potential in a selected zone of the metal treating system.

In carrying out the present invention there may be utilized any suitable source of a non-oxidizing carbon-removing atmosphere which is periodically established in the region of the sensitive element. Since the objectionable soot is that which coats the sensitive element, its reaction with the carbon-removing atmosphere must proceed before the sensitive element beneath it is exposed to the action of the atmosphere. Thus the soot or free carbon is first removed from the detecting element and from the surfaces of the structure supporting and surrounding that element. The carbon-removing atmosphere is maintained on the sensitive element for an additional length of time until the carbon content has been reduced by a predetermined amount which is but a small fraction of the carbon removal required for calibrating the sensitive element.

When the predetermined reduction in carbon content of the sensitive element occurs, it is known that that element is responding in proper fashion to the carbon potential of its ambient atmosphere. Stated differently, the soot or carbon clean-up operations will have been completed and the sensitive element ready to resume its principal purpose in providing a measurement and control of the carbon potential in a selected zone of the metal treating system.

Figure 2:
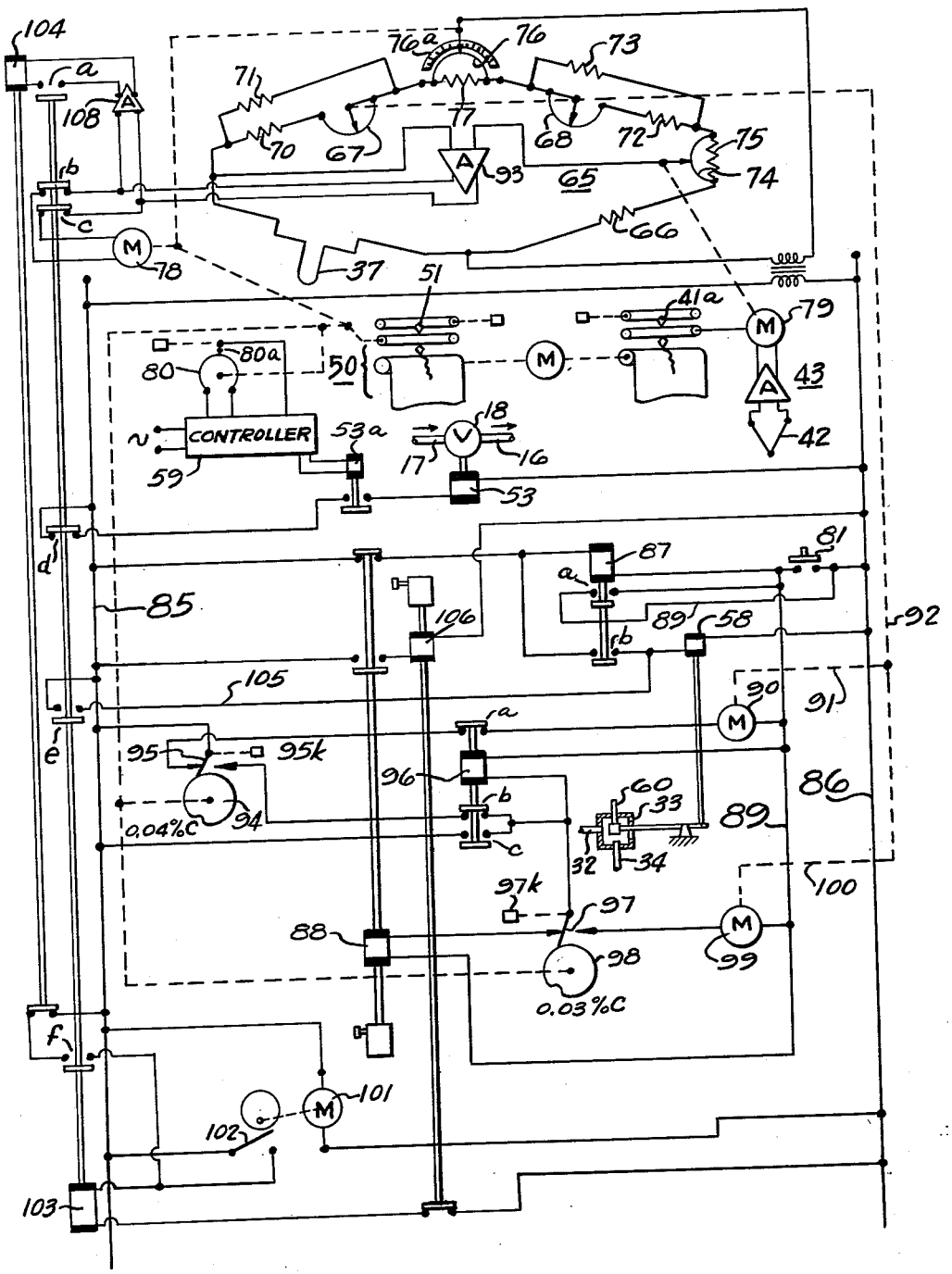

For further objects and advantages of the invention and for a full disclosure of an exemplary embodiment of the invention, reference is to be had to the following detailed description taken in conjunction with the drawings, in which:

FIG. 1 diagrammatically illustrates a metal treating furnace and associated measuring and control equipment embodying the present invention; and FIG. 2 is a wiring diagram applicable to the embodiment of FIG. 1 for establishing operations thereof in accordance with the present invention.

Though the present invention may be applied to carbon-potential controlling systems of widely differing character as will be later explained, it has been shown in FIG. 1 as applied to the apparatus illustrated in my copending application, Serial No. 41,965, filed July 11, 1960.

For the purposes of the present invention it will be assumed that a metal treating furnace 10 having access doors 11 and 12 and a heating element 47 is to have maintained therein a carburizing atmosphere having a carbon potential of relatively high value. In carburizing, the purpose is to transfer to the surface of the work carbon in desired amount. The penetration of the carbon is dependent upon time, temperature, the carbon potential of the atmosphere, and the composition of the work. The quantity of carbon transferred to the surface region of the work depends upon the above quantities and in addition, of course, the area of the work exposed to the carburizing atmosphere and the initial carbon content of the work. By reason of the foregoing features, many metal treating operators prefer to maintain within the metal treating furnace 10 carbon potentials which are relatively high; that is to say, if the work has an initial carbon content of 0.2%, the carbon potential maintained in the furnace atmosphere may exceed 1.3%.

As shown, the carbon potential of the atmosphere of furnace 10 is produced as by a gas generator 14 which under the control of a throttling valve 15 introduces through line 16 a carrier gas. The gas generator 14 may be supplied with natural gas and by reasons of reactions therein will provide a carrier gas in line 16 largely comprising carbon monoxide, hydrogen and nitrogen. The carrier gas is enriched, that is, its carbon content increased by the addition thereto in line 16 of an enriching fluid which may be either liquid or gas but as shown, may comprise natural gas (methane) from a supply line 17 regulated as to quantity by the operation of a throttling valve 18. The carrier gas and the enrichment fluid are effective to establish within the furnace 10 carbon potentials of a desired magnitude within a selected range.

For the measurement of the carbon potentials a sample stream is withdrawn through a sample line 20 by way of a valve 21, a filter 22 and a pump 23. The withdrawn sample flows through a flow meter 30, through a line 32, a calibration valve 33, and by way of a line 34 into a constituent-measuring assembly 35. The sample stream passes downwardly through a tubular member 36 in which there is supported a sensitive detecting element 37 preferably in the form of a filamentary ferrous material and such as disclosed in Finch Patent 2,325,759, though other ferrous alloys may be utilized including the nickel alloy of my Patent 2,698,222.

The sensitive element 37 and the tube 36 are disposed within an outer tube 38 and the assembly as a whole extends through a heated compartment or furnace 39. A suitable heating means, as for example a heating coil 40 with its energization regulated by a controller 41 operating in response to a thermocouple 42 and a measuring instrument 43, maintains the compartment at a temperature corresponding with that of the surface of the work within the furnace 10.

For a single-zone system as shown in FIG. 1, the temperature of compartment 39 will in general be made to correspond with the temperature measured by a thermocouple 45 disposed within the furnace 10 and operable under the control of a measuring instrument 46 to regulate the energization of a heating coil 47 provided for furnace 10 to maintain the temperature in furnace 10 at a preselected value.

In metal treating furnaces where there are two or more zones of both temperature control and atmosphere control and where there exists a difference in temperature between zones, it will be understood that the temperature of compartment 39 will be maintained at a value, by adjustment of control point setter 41a associated with control 41, to correspond with the temperature of the zone of the multiple zone furnace from which the most significant sample stream is withdrawn by a sampling tube such as the sampling tube 20.

The withdrawn sample establishes an atmosphere about the sensitive element 37 with a carbon potential corresponding with that within the furnace 10. From the region of element 37, the sample stream flows downwardly through a mass of manganin wool 48. It then flows upwardly in the space between tubular members 36 and 38 and is discharged through a valve 49 to atmosphere. The sensitive element 37 is connected by conductors 37a and 37b to a measuring instrument 50 having a control point setter 51 for operation of a controller 52 which is effective to control the energization of a solenoid 53 for operation of the throttling valve 18. The operation is such that if the carbon potential as detected by the element 37 is less than that of the control point the solenoid 53 is energized to increase the admission of the enrichment fluid to the carrier gas in line 16. If the carbon potential is above that of the control point the throttling valve 18 is operated to reduce the flow of enrichment fluid.

It is to be observed that the outer tubular member 38 extends downwardly of the lower wall of the furnace 39 and has a wide mouth opening to receive products of combustion from a burner 54 supplied with fuel from a supply line 55 and under the control of a throttling valve 56. The products of combustion flow upwardly through the tubular member 38 and outwardly through the valve 49 and without effect upon the sensitive element 37 so long as there is downward flow of the sample stream from the furnace 10.

With the foregoing understanding of the operation of the apparatus of FIG. 1 it will be seen that if carbon deposition takes place on the sensitive element 37 due to sooting conditions within the tubular member 36, the carbon potential seen by the element 37 will be adversely affected. It will be adversely affected by reason of the insulating effect of soot on the element itself and it will be adversely affected if the soot parallels the sensitive filament or bridges the two legs of that element which is shown in the form of a return bend. The element 37 will appear to have an increased conductivity due to the shunting path provided by a deposit of soot. In my aforesaid application, Serial No. 41,965, there has been described the operation of a calibrating valve corresponding with valve 33 as by means of a solenoid 58 energized by suitable control means 59 periodically to close the line 34 and to connect the line 32 to atmosphere as by way of line 60. When downward flow of the sample stream within member 36 is thus interrupted the combustion gases entering through the tubular member 38 then diffuse through the manganin wool 48 and produce a non-oxidizing carbon-removing atmosphere in the location of the sensitive element 37. It is in this manner that the carbon content of the sensitive element 37 is reduced to a reproducible minimum value and which minimum value may then be utilized to calibrate the measuring system to increase the precision of measurement of the carbon potential within the atmosphere of furnace 10.

In accordance with the present invention there is periodically established in the region of the sensitive element 37 the carbon-removing atmosphere but for periods of time materially less than required for calibrating the measuring system. By reason of the periodic presence of the carbon-removing atmosphere there will be prevented an accumulation of soot within the region of the sensitive element and prevention of buildup of a deposit thereupon. It has been found that if the carbon-removing atmosphere be maintained in the region of the sensitive element 37 until its carbon content shall have been reduced by 1% to 2% of full scale of the instrument 50 (and which ordinarily for the purposes of this invention may correspond with a maximum carbon potential of 1.7) there will have been effected a clean-up operation providing assurance that the sensitive element 37 is responding to the carbon potential of the atmosphere unaffected by the presence of free carbon in the form of soot, and the like.

In connection with the foregoing, it is to be noted that there does not occur within the tubular member 36 reverse flow of gases within that member. When line 34 is closed by valve 33, there does occur inward flow of the products of combustion but as mentioned above, this flow is by diffusion through the manganin wool 48 and by diffusion outwardly of some of the displaced gases from within the tubular member 36 thus progressively to reduce the carbon potential of the atmosphere in contact with element 37. As that carbon potential is reduced from its previous value there is carbon removal by the reactions with components of the carbon-removing atmosphere such as carbon dioxide, water vapor, and hydrogen. With removal of the soot and of a small fraction of carbon from the element 37, the clean-up operation is terminated and there is resumption of flow of the sample stream downwardly of the tubular member 36. The resultant positive downward flow immediately reestablishes in the region of the sensitive element 37 an atmosphere corresponding with that of the furnace 10 since that mixture is not greatly affected by the diffusion of gases inwardly of the wool 48 in the region above element 37. Thus there is a minimum delay following a clean-up operation in reestablishing the desired conditions for measurement of the carbon potential of furnace 10 with accuracy sufficient for this type of application.

Other advantages accrue from the arrangement thus far described. As will later be described in detail, by establishing clean-up operations in relatively close succession and of relatively short duration, the carbon content of the sensitive element 37 may not during the measurement period rise to the value corresponding with the existing carbon potential of the atmosphere, but it will rise to a related value somewhat below the full atmosphere potential. Thus the sensitive element 37 will nevertheless in accordance with the invention, be made useful for the control of carbon potentials within a range above that to which the element 37 best responds. The element 37 is preferably utilized for the control of carbon potentials up to about 1.35. If equilibrium conditions were established for element 37 with carbon potential above about 1.35, graphite will appear within the element 37 and sooting, in time, is certain to occur. by the frequent decarburizing cycles, there are minimized the adverse effects of free carbon or soot in the region of the sensitive element 37.

Referring now to FIG. 2, the features of the present invention have been incorporated into the control system of FIG. 4 shown in my copending application, Serial No. 790,123, filed January 30, 1959, for "Measurement and Control of Constituent Potential," now Patent No. 3,011,873, suitably modified to meet the requirements of the present invention. The system of FIG. 2 not only includes the automatic calibrating operations of my aforesaid pending applications but coordinates with such calibrating operations the clean-up operations fully discussed above. More particularly, the instrument 50 of FIG. 1 has been illustrated in FIG. 2 as including a Wheatstone bridge 65 in which the senstive element 37 is included in one arm.

A resistor 66 is included in an adjacent arm. Each of the opposite arms respectively includes rheostats 67 and 68. A resistor 70 is in series with rheostat 67, and the series combination is shunted with a resistor 71. Similarly, a resistor 72 is in series with rheostat 68, and the series combination is shunted by resistor 73. Between the latter arm and resistor 66 is a slidewire resistor 74 shunted by a resistor 75. Between the two arms including the rheostats 67 and 68 is a slidewire resistor 76 shunted by a resistor 77. The movable contact of slidewire 76 is driven by a motor 78 through a mechanical connection indicated by the broken lines. The contact of slidewire 74 is driven by a motor 79 forming a part of the instrument 43 to introduce compensation for the temperature of element 37. The instrument 43 includes an amplifier to the input of which is connected the thermocouple 42 disposed in furnace 39 of FIG. 1.

Since at the beginning of operations, the carbon potential in furnaces 10 and 39 will be quite low, the motor 78 will have been energized to drive the contact of the slidewire 76 toward the lower end of the scale. At the same time, the motor 78 will rotate a slidewire 80 relative to its contact 80a to produce an output from the controller 59 which energizes a relay 53a. As the carbon potential of furnace 10 rises to the control range, the controller 59, in manner explained in Davis Patent 2,823,861, will intermittently energize relay 53a to open and close valve 18 by operation of its solenoid 53. The "on" time (the time the valve is open) relative to the "off" time (the time the valve is closed) will be varied automatically in response to change in load and deviation from the control point, to maintain quite accurately at a selected value the carbon potential of the atmosphere in furnace 10.

In the above brief description, it has been tacitly assumed that the sensitive element 37 is "in calibration," that is, that the relation between its resistance and its carbon content has not been affected by interim conditions. In order for the work to be subjected to an atmosphere of desired constitutent potential, it will ordinarily be desirable to initiate a calibrating operation shortly after conditions have stabilized in furnace 10 of FIG. 1 following the loading thereof with work.

The calibrating operations are initiated by momentary closure of a calibrating switch 81. There is then completed from a supply line 85 an energizing circuit for the operating coil of a relay 87. This circuit extends through the normally closed contacts of a timing relay 88. The a contacts of relay 87 are closed to complete a holding circuit for relay 87 and to connect a conductor 89 to supply line 86. The closure of the b contacts of relay 87 completes an energizing circuit for the solenoid 58 of valve 33 which transfers the connection of line 32 to a line 60. There is thus initiated the decarburizing of the element 37 as above explained.

Upon the aforesaid energization of relay 87, there is completed an energizing circuit for a motor 90 which motor through broken-line connections 91 and 92 drives the movable contacts of calibration resistors or rheostats 67 and 68 in directions to unbalance the bridge 65 in the same manner as would occur upon reduction of the carbon content of element 37 to a value corresponding with +0.04% carbon. As soon as the contacts of rheostats 67 and 68 begin to move, the resultant unbalance of the bridge 65 through an amplifier 93 energizes the motor 78 for operation in a direction to restore balance, that is to say, to drive the contact of sidewire 76 downscale to a corresponding valve of +0.04% C. When this point on the scale 76a has been attained, the notch of a notched cam 94 driven by the motor 78 opens the motor circuit traced through the left-hand contacts of a switch 95, and closes a circuit through the righthand contacts to energize a relay 96. This relay opens its a contacts to prevent later energization of motor 90 upon later closure of the left-hand contacts of switch 95. The closing of the c contacts of relay 96 completes a holding circuit for its operating coil and also a circuit to a cam operated switch 97. This circuit extends from the left-hand contacts of that switch to the operating coil of a timing means, shown as the timing relay 88. This timing relay 88, though energized, does not open its contacts until the expiration of an interval of time, such for example, as about five minutes. If there is no further decrease in the resistance of element 37 during the time the contacts of relay 88 are closed there is assured the attainment by the element 37 of its reproducible low carbon content.

At the time the cam operated switch 95 is first operated, the removal of carbon from element 37 with its consequent reduction in the value of resistance of that element unbalances the bridge in a direction showing decreased carbon in element 37. As soon as this occurs, the motor 78 restores balance by operation of the contact of slidewire 76, and at the same time operates the cam 98 of switch 97 to open the circuit through its left-hand contacts and to close a circuit for a motor 99 through its right-hand contacts. This motor, through a mechanical connection 100 and mechanical connection 92 thereupon drives the contacts of the rheostats 67 and 68 upscale again to tend to unbalance the bridge 65.

It is to be here noted that upon the opening of the left-hand contacts of switch 97, the timing relay 88 is deenergized. Each time that relay is deenergized, it resets itself so that a new timing cycle is initiated when the relay is again energized.

For each readjustment of rheostats 67 and 68 by motor 99, there is immediate adjustment of the contact of slidewire 76 produced by unbalance of the bridge 65 which results in energization of motor 78. The result is the rebalancing of the bridge 65. In rebalancing bridge 65, the motor 78 operates cam 98 to open the circuit to motor 99 and to close the circuit of the timing relay. This cyclic operation continues as long as the resistance of element 37 is changing. As its resistance approaches a value corresponding with a carbon content of +0.03%, the rate of change in resistance becomes less and less, and the timing relay 88 is energized for increasingly longer intervals.

In this connection, it is to be noted that whenever the motor 78 is energized to operate switch 97 to energize motor 99, there is an immediate unbalance of the bridge in an upscale direction which thereupon causes the motor 78 to rebalance in the upscale direction immediately to open the contacts of switch 97 to deenergize motor 99.

Whenever the motor 99 remains deenergized for a period of approximately five minutes, it is known that the resistance of element 37 has attained its minimum low value corresponding with the carbon content of between +0.03% and +0.04%. Thus at the end of the five-minute period, timing relay 88 "times-out" to open its contacts and to deenergize the relay 87. This terminates the calibrating operation, and the calibrating valve 33 is again deenergized and so returns to its illustrated position. The system is then in calibration for control of the constituent potential of furnace 10 with relatively high precision.

In my copending application, Serial No. 790,123, the calibrating operation utilized dissociated ammonia to establish a carbon-removing atmosphere for the sensitive element 37 and accordingly there were utilized carbon potential settings for the cams 94 and 98 of a lower order than have been set forth above. Knobs 95k and 97k have been illustrated to indicate that each cam may be adjustably secured to its shaft or that the support for the respective switches 95 and 97 may be angularly rotated about the axes of their shafts for relative adjustment between the switch assemblies and their respective cams.

It is in this manner that the switches 95 and 97 are operated at the desired levels of carbon in the sensitive element 37. Though in the system of my said copending application, Serial No. 790,123, provisions were made to protect the sensitive element, as for example element 37, from carbon potentials above about 1.25% carbon, the system of the present invention contemplates that the sensitive element 37 will be effective for the measurement and control of carbon potentials well in excess of 1.25% carbon.

Pursuant to the present invention there is provided a timing device shown in the form of a motor 101 which periodically and momentarily closes a switch 102 to complete an energizing circuit for a relay 103 which then operates to close its *a*, *e* and *f* contacts and to open its *b*, *c* and *d* contacts. The opening of the *b* and *c* contacts of relay 103 disconnects the motor 78 from amplifier 93 and transfers the output connections of that amplifier through contacts *a* to a relay 104. It is to be understood that the motor 78 will have been functioning to maintain the bridge 65 in balance. Accordingly, at the time of transfer of the output of amplifier 93 to the relay 104 the bridge was in balance and accordingly relay 104 will not be energized. However, there will be completed through the "*f*" contacts a holding circuit for relay 103 and through contacts *e* an energizing circuit for the solenoid 58 of the transfer valve 33 to discontinue the supply of the sample stream through line 32 and line 34 to the sensitive element 37. Decarburizing gases then diffuse into the region of element 37.

The foregoing circuit may be traced from supply line 85 by way of contacts *e* and by way of conductor 105 and the solenoid 58 to the other supply line 86. The carbon-removing atmosphere produced in the region of the detecting element 37 removes any soot or carbon deposited upon the element and further initiates the removal of carbon from the element itself. If soot has decreased the resistance of element 37, the removal of that soot in the form of free carbon will cause the bridge 65 to be temporarily unbalanced in a direction indicating the true and higher value of resistance of element 37. The relay 104 does not respond to unbalance in the aforesaid direction, however, by reason of the inclusion in its circuit of the amplifier-control arrangement 108 which is described in FIG. 7 of my Patent 2,698,222.

In brief, the amplifier arrangement 108 energizes the relay 104 after unbalance of the bridge 65 in the direction corresponding with a reduction of carbon content of element 37 and by the predetermined amount of 1% to 2% of the full-scale reading on scale 76a. Thus the carbon-removing action will continue until the carbon content is decreased from say 1.35% C to about 1.32% C. The relay 104 will then be energized to open its contacts, thus interrupting the holding circuit of relay 103 completed through the *f* contacts of that relay. As a result the relay 103 will be deenergized. The output of amplifier 93 will be returned to motor 78, the solenoid 53 of valve 18 will again be energized dependent upon relay 53a, and the solenoid 58 of valve 33 will be deenergized to return the valve 33 to the illustrated position.

The system of the present invention includes the timing relay 106 and the normally open contacts of timing relay 88 for the purpose of preventing inter-action between the above described clean-up operations and the calibrating operations. More particularly, since the carbon content of element 37 will during calibration be reduced to its reproducible minimum value, it is desired to prevent the initiation of one of the periodic clean-up operations until after the carbon content of sensitive element 37 has been returned to within its operating range. To assure the foregoing objectives, it will be seen that as relay 88 is energized, it closes its normally open contacts to complete an energizing circuit for the timing relay 106. Each time the normally open contacts of timing relay 88 are closed the operating coil of timing relay 106 is momentarily energized. The contacts of this relay are time-delayed in closing and for an interval equal to that required for the increase of the carbon content from the calibrating value to a value within the carburizing range, of the order of five minutes. Accordingly, a clean-up operation may not be initiated by energization of relay 103 until the contacts of relay 106 are again closed and relay 103 energized to complete the energizing circuit to the solenoid 58 of the transfer valve 33 by way of the "*e*" contacts of relay 103. In this way the two operations are made independent of each other.

In summary, the present invention makes possible the use of the detecting element 37 for the measurement of carbon potentials within the range which may produce sooting conditions within the tubular member 36 of FIG. 1, which sooting conditions would otherwise interfere with the accuracy of the measurement. This result is accomplished by the provision of the timing means including the motor 101 and switch 102 operating in a periodic or cyclical manner for the energization of the relay 103 to initiate the production about the element 37 of a carbon-removing atmosphere before the attainment of equilibrium by the element 37 with the carburizing atmosphere whose carbon potential is being measured. In this manner the operation of the element 37 is maintained efficient notwithstanding its attainment of carbon contents higher than those heretofore believed feasible. Thus the carbon content of element 37 may rise to values as high as 1.65 and above, values ordinarily associated with sooting. Nevertheless, by the clean-up operations, periodically initiated, that is, from three minutes to five minutes apart, the element 37 is maintained free of soot and with its average carbon content somewhat below the actual carbon potential of the carburizing atmosphere under measurement. The frequency of initiation of the clean-up operation will, of course, depend upon such features as the carbon potential of the atmosphere under measurement and the temperature of that atmosphere. That frequency will be adjusted to suit particular installations embodying the present invention by changing the frequency of operation of the timer including motor 101. In addition to the clean-up operation, the element 37 is periodically subjected to the carbon-removing atmosphere for periods long enough to attain its minimum reproducible value of carbon for calibration of the measuring circuit and without interference one with the other of the clean-up operations and the calibrating operations.

Mention has already been made of the fact that certain features of the present invention has been disclosed in my copending application Serial No. 790,123 and in my copending application Serial No. 41,965. As further exemplary of features claimed in my copending applications, reference is made in the latter application to the feature of providing metallic wool and the like in the flow path of gases forming the decarburizing atmosphere and of gases forming the carburizing atmosphere for the detecting element 37. This feature protects the element 37 against oxidation. Stated differently, this feature modifies the character of the decarburizing atmosphere to assure an oxidation potential below that which will oxidize the ferrous detecting element 37 though effective in removing carbon therefrom.

As disclosed and claimed in my copending application Serial No. 41,965, the reducing agent is preferably a metallic wool inert to carbon. Preferably, it comprises manganin wool. The term "wool" is defined for the purposes of this application as including metal cloth. Thus the manganin wool may take the form of No. 36 wire flattened and woven into a fabric, which fabric is then rolled and pressed into the flow channel in the region near its open end and below the sensitive element 37.

As for the manganin itself, any of the commercial grades of that alloy will be suitable. As indicated above, all alloys will be suitable if inert to carbon, that is, alloys which do not absorb carbon. Manganin and similar alloys are preferred because of the presence of manganese, a material which is active in forming oxygen compounds.

When copper and copper alloys are utilized, the amount of wool utilized will be increased because of the decreased activity in respect to oxygen, particularly when the affinity for oxygen is less than that of manganin.

What is claimed is:

1. In a system for measuring the carbon potential of the atmosphere of a carburizing furnace supplied with a carburizing agent, the combination of a carbon-potential detecting element of ferrous metal, an electrical characteristic of which varies with change in carbon content thereof, a balanceable electrical network including said detecting element, rebalanceable means operative in response to unbalance of the network for rebalancing said network to provide an indication of change of the carbon content of said element, an enclosure for said detecting element for confining around said element the atmosphere whose carbon potential is to be measured, decarburizing means for producing within said enclosure an atmosphere of carbon-removing character, means for periodically actuating said decarburizing means and for concurrently disconnecting said balanceable measuring circuit from said rebalanceable means, means reponsive to the unbalance of said measuring circuit in a direction corresponding with removal from said detecting element of a small fraction of its total carbon content for termination of actuation of said decarburizing means to return to said detecting element said atmosphere whose carbon potential is to be measured and again to connect the ouput of said measuring circuit to said rebalanceable means, additional means for controlling said decarburizing means to maintain said carbon-removing atmosphere on said detecting element until the carbon content thereof has attained a predetermined reproducible minimum value, means operable upon attainment of said reproducible value for adjusting said measuring network for an output corresponding with said reproducible minimum value, and means for preventing interruption of said carburizing means immediately following a calibrating operation and until sufficient time has elapsed for the return to said detecting element of a carbon content corresponding with that of said carburizing atmosphere.

2. The combination with a detecting element of filamentary ferrous metal whose resistance varies with the carbon content thereof, of atmosphere-controlling means for selectively producing around said detecting element a sample atmosphere whose carbon potential is to be measured and a carbon-removing atmosphere, a measuring circuit including said detecting element for producing an output varying with change in resistance of said detecting element, means for operating said detecting element at carbon potentials within the range giving rise to deposition of soot from the carburizing atmosphere comprising cyclically operable means for periodically surrounding said detecting element with a carbon-removing atmosphere for removal of any soot upon the surface thereof and for removing carbon therefrom, means responsive to removal of a small fraction of the total carbon from said detecting element for returning the atmosphere surrounding said detecting element to said carburizing atmosphere, said cyclically operable means permitting said carburizing atmosphere to surround said detecting element for intervals of time less than required for said detecting element to attain equilibrium with the carbon potential of said carburizing atmosphere, additional means for controlling said decarburizing means to maintain said carbon-removing atmosphere on said detecting element until the carbon content thereof has attained a predetermined reproducible minimum value, means operable upon attainment of said reproducible value for adjusting said measuring network for an output corresponding with said reproducible minimum value, and means for preventing interruption of said carburizing means by said cyclically operable means immediately following a calibrating operation and until sufficient time has elapsed for the return of said detecting element to a carbon content corresponding with that of said carburizing atmosphere.

3. In a system for measuring the carbon potential of the atmosphere of a carburizing furnace supplied with a carburizing agent, the combination of a carbon-potential detecting element of ferrous metal, an electrical characteristic of which varies with change in carbon content thereof, a balanceable electrical network including said detecting element, rebalanceable means operative in response to unbalance of the network for rebalancing said network to provide an indication of change of the carbon content of said element, an enclosure for said detecting element for confining around said element the atmosphere whose carbon potential is to be measured, decarburizing means for producing within said enclosure an atmosphere of carbon-removing character, means for periodically actuating said decarburizing means to initiate a period of carbon removal for cleaning said detecting element and for concurrently disconnecting said balanceable measuring circuit from said rebalanceable means to prevent operation of said balanceable means during said period, and means responsive only to the unbalance of said measuring circuit in a direction corresponding with removal from said detecting element of only a small fraction of its total carbon content for again connecting the output of said measuring circuit to said rebalanceable means to terminate said period and again to suround said detecting element with said atmosphere whose carbon potential is to be measured.

4. The combination with a detecting element of filamentary ferrous metal whose resistance varies with the carbon content thereof, of atmosphere-controlling means for selectively producing around said detecting element a sample atmosphere whose carbon potential is to be measured and a carbon-removing atmosphere, a measuring circuit including rebalancing means and said detecting element for producing an output varying with change in resistance of said detecting element, means for operating said detecting element at carbon potentials within the range giving rise to deposition of soot from the carburizing atmosphere comprising cyclically operable means for rendering said rebalancing means inoperative during successive time intervals and for periodically surrounding said detecting element with a carbon-removing atmosphere during each said time interval for removal of any soot upon the surface thereof and for removing carbon therefrom, and means responsive to an unbalance of said measuring circuit indicative of removal of a small fraction of the total carbon from said detecting element for returning the atmosphere surrounding said detecting element to said carburizing atmosphere and for reestablishing operation of said rebalancing means, said cyclically operable means permitting said carburizing atmosphere to surround said detecting element for intervals of time less than required for said detecting element to attain equilibrium with the carbon potential of said carburizing atmosphere.

5. In a system for measuring the carbon potential of the atmosphere of a carburizing furnace supplied with a carburizing agent, the combination of a carbon-potential detecting element, and electrical characteristic of which varies with change in carbon content thereof, a balanceable electrical network including said detecting element, rebalancing means responsive to the output of said network for rebalancing that network to provide an indication of change of the carbon content of said element, means for operating said detecting element at carbon potentials within the range giving rise to deposition of soot from said carburizing atmosphere comprising cyclically operable means for rendering said rebalancing means inoperative during successive time intervals and for periodically surrounding said detecting element with a carbon removing atmosphere during each said time interval for removal of any soot on the surface thereof and for removing carbon therefrom, and means operative only during said time intervals in response only to unbalance of said measuring network in the direction indicative of removal of a small fraction of carbon from said detecting element for again subjecting said detecting element to said carburizing atmosphere and for concurrently reestablishing operation of said rebalancing means.

References Cited in the file of this patent
UNITED STATES PATENTS
2,698,222 Davis _____ Dec. 28, 1954